US009271509B2

(12) United States Patent
Estes et al.

(10) Patent No.: US 9,271,509 B2
(45) Date of Patent: *Mar. 1, 2016

(54) POULTRY CHILLER WITH MULTI-BLADE LONG-PITCH AUGER

(71) Applicant: Cooling & Applied Technology, Inc., Russellville, AR (US)

(72) Inventors: Jeremy B. Estes, London, AR (US); Michael E. Miller, Hattieville, AR (US)

(73) Assignee: Cooling & Applied Technology, Inc., Russellville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,718

(22) Filed: Jun. 24, 2015

(65) Prior Publication Data
US 2015/0289526 A1 Oct. 15, 2015

Related U.S. Application Data

(63) Continuation of application No. 14/211,608, filed on Mar. 14, 2014, now Pat. No. 9,089,149.

(60) Provisional application No. 61/798,286, filed on Mar. 15, 2013.

(51) Int. Cl.
*A23B 4/00* (2006.01)
*A22C 21/00* (2006.01)

(52) U.S. Cl.
CPC ..................................... *A22C 21/00* (2013.01)

(58) Field of Classification Search
CPC ...... A22C 21/00; A22C 21/0061; F25B 25/02

USPC ........... 62/381, 63; 99/516, 517, 536; 165/86, 165/87, 89
See application file for complete search history.

(56) References Cited

U.S. PATENT DOCUMENTS

| 2,302,169 | A | 11/1942 | Baker |
| 2,418,746 | A | 4/1947 | Bartlett et al. |
| 2,610,033 | A | 9/1952 | Rietz |
| 2,942,429 | A | 6/1960 | Van Dolah |

(Continued)

FOREIGN PATENT DOCUMENTS

| AU | 2007221962 | 4/2009 |
| EP | 0933125 | 8/1999 |

(Continued)

OTHER PUBLICATIONS

MSC Engineering—Screw Conveyor Systems and Materials Handling Machinery, http://www.foodprocessing-technology.com/contractors/materials/mscengineering.

(Continued)

*Primary Examiner* — Nina Bhat
(74) *Attorney, Agent, or Firm* — Richard Blakely Glasgow

(57) ABSTRACT

An auger-type poultry chiller having an auger with multiple long-pitch auger blades. The blades of the auger create pockets that spiral around the auger shaft and extend the length of the auger. While the product in the chiller is locked into a certain pocket, it is not locked into a certain spot lengthwise in the chiller. The product, therefore, is able to distribute evenly along the length of the chiller within its pocket even if there are gaps in loading time or if unloading stops momentarily.

19 Claims, 4 Drawing Sheets

(56) References Cited

U.S. PATENT DOCUMENTS

| | | |
|---|---|---|
| 3,092,975 A | 6/1963 | Zebarth |
| 3,097,501 A | 7/1963 | Pappas |
| 3,250,086 A | 5/1966 | Morris, Jr. |
| 3,368,363 A | 2/1968 | Alaburda et al. |
| 3,395,549 A | 8/1968 | Grimes |
| 3,410,101 A | 11/1968 | Morris, Jr. |
| 3,587,241 A | 6/1971 | Hagen |
| 3,642,495 A | 2/1972 | Davidson et al. |
| 3,689,958 A | 9/1972 | Dillon |
| 3,881,322 A | 5/1975 | Le Diouron |
| 3,906,743 A | 9/1975 | Schorsch et al. |
| 4,138,860 A | 2/1979 | Drummond |
| 4,499,740 A | 2/1985 | Older et al. |
| 4,567,941 A | 2/1986 | Coppolani et al. |
| 4,569,204 A | 2/1986 | Ott et al. |
| 4,688,476 A | 8/1987 | Zittel |
| 4,697,508 A | 10/1987 | Tallafus |
| 4,761,962 A | 8/1988 | Andersson |
| 4,788,831 A | 12/1988 | Crawford et al. |
| 4,827,727 A | 5/1989 | Caracciolo |
| 4,843,840 A | 7/1989 | Gibson |
| 4,849,237 A | 7/1989 | Hurst |
| 4,875,344 A | 10/1989 | Zittel |
| 4,989,416 A | 2/1991 | Miller et al. |
| 4,994,294 A | 2/1991 | Gould |
| 4,997,578 A | 3/1991 | Berggren |
| 5,133,249 A | 7/1992 | Zittel |
| 5,146,841 A | 9/1992 | Zittel |
| 5,295,366 A | 3/1994 | Lopez et al. |
| 5,329,842 A | 7/1994 | Zittel |
| 5,341,729 A | 8/1994 | Zittel |
| 5,390,900 A | 2/1995 | Ginzburg |
| 5,427,015 A | 6/1995 | Zittel |
| 5,484,615 A | 1/1996 | Kounev |
| 5,562,010 A | 10/1996 | McGuire |
| 5,592,869 A | 1/1997 | Zittel |
| 5,669,288 A | 9/1997 | Zittel et al. |
| 5,692,382 A | 12/1997 | Davison |
| 5,741,066 A | 4/1998 | Presnell |
| 5,752,431 A | 5/1998 | Zittel |
| 5,809,787 A | 9/1998 | Zittel |
| 5,857,350 A | 1/1999 | Johnson et al. |
| 5,868,000 A | 2/1999 | Morris, Jr. et al. |
| 5,868,065 A | 2/1999 | Haggerty et al. |
| 5,947,014 A | 9/1999 | Koch |
| 6,086,833 A | 7/2000 | Conners et al. |
| 6,095,035 A | 8/2000 | Zittel et al. |
| 6,105,485 A | 8/2000 | Zittel |
| 6,105,490 A | 8/2000 | Horn et al. |
| 6,205,913 B1 | 3/2001 | Zittel et al. |
| 6,263,785 B1 | 7/2001 | Zittel |
| 6,308,529 B1 | 10/2001 | Bass |
| 6,397,622 B1 * | 6/2002 | Miller et al. .................... 62/381 |
| 6,722,490 B1 | 4/2004 | Bass |
| 6,865,895 B2 | 3/2005 | Bass |
| 6,951,273 B2 * | 10/2005 | Bass ............................ 198/657 |
| 7,131,765 B2 | 11/2006 | Backhaus |
| 7,174,724 B2 | 2/2007 | Morris, III et al. |
| 7,281,384 B2 | 10/2007 | Morris, III et al. |
| 7,419,049 B2 | 9/2008 | Henry |
| 7,470,173 B2 | 12/2008 | Morris, III et al. |
| 7,588,489 B2 | 9/2009 | Morris, III et al. |
| 9,089,143 B2 | 7/2015 | Estes |
| 2005/0058013 A1 * | 3/2005 | Warf et al. ..................... 366/98 |
| 2007/0287371 A1 * | 12/2007 | Morris et al. ................. 452/173 |
| 2009/0241583 A1 * | 10/2009 | Cathey et al. ................... 62/375 |
| 2011/0203778 A1 * | 8/2011 | Estes et al. ................ 165/109.1 |
| 2012/0042789 A1 | 2/2012 | Hognason |
| 2014/0202659 A1 | 7/2014 | Sekiguchi |

FOREIGN PATENT DOCUMENTS

| | | |
|---|---|---|
| JP | 2008-298446 | 12/2008 |
| WO | 91/05212 | 4/1991 |
| WO | 99/21429 | 5/1999 |

OTHER PUBLICATIONS

Screw Conveyor Engineering Guide: Basic Conveyor Flight & Pitch Types, http://www.kwsmfg.com/services/screw-conveyor-engineering-guide/conveyor-flight-pitch-types.htm.

Morris & Associates, High Side/High Flow Auger Poultry Chiller with Patented IntraGrill Design, P/N 8090-0027-00, Rev. 20130509.

Morris & Associates, High Side/High Flow Auger Poultry Chiller with Patented IntraGrill Design, MAT (.5M-0107).

Morris & Associates, High Capacity Auger Chiller with Patented IntraGrill Design, P/N 8090-0027-00, Rev. 20150819.

Machine Translation, JP 2008-295446.

* cited by examiner

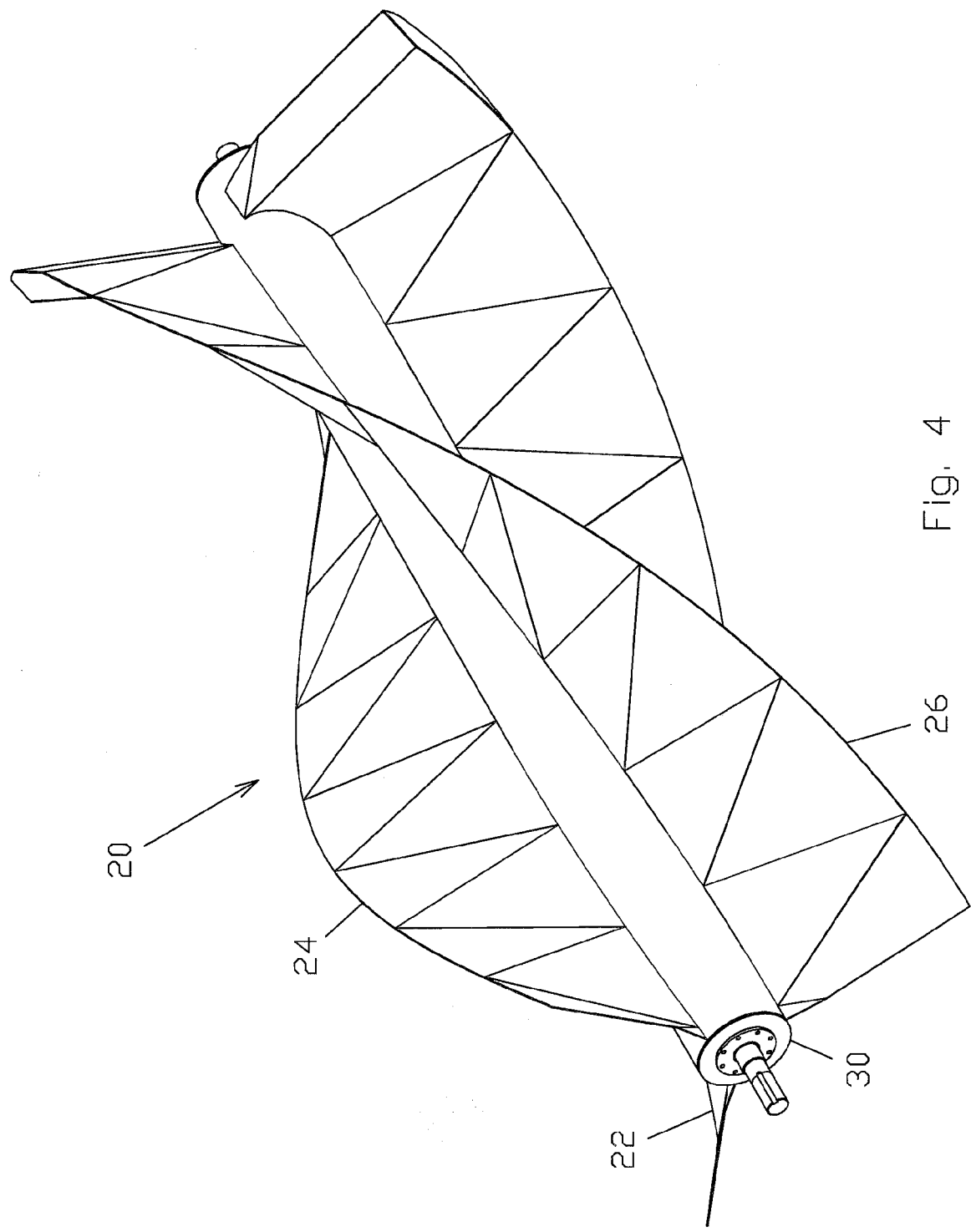

POULTRY CHILLER WITH MULTI-BLADE LONG-PITCH AUGER

CROSS-REFERENCE TO RELATED APPLICATIONS

This application is a continuation application of, and the claims the benefit of, U.S. patent application Ser. No. 14/211,608, now U.S. Pat. No. 9,089,149, entitled "Poultry Chiller with Multi-Blade Long-Pitch Auger" and filed on Mar. 14, 2014, which claims the benefit of U.S. Provisional Application No. 61/798,286, entitled "Poultry Chiller with Multi-Blade Long-Pitch Auger" and filed on Mar. 15, 2013. The complete disclosure of said patent applications is hereby incorporated by reference.

STATEMENT REGARDING FEDERALLY SPONSORED RESEARCH OR DEVELOPMENT

Not applicable

BACKGROUND OF THE INVENTION

1. Field of the Invention

The present invention relates to an auger-type poultry chiller and, in particular, to a poultry chiller having an auger with multiple long-pitch blades around the auger shaft causing increased cooling and agitation of the poultry carcasses in the chiller.

2. Brief Description of the Related Art

After evisceration, slaughtered poultry carcasses must be rapidly chilled to preserve the quality of the meat. Various types of poultry chillers are known in the art, but one common type is an auger-type poultry chiller. Auger-type chillers are typically in the form of semi-cylindrical tanks filled with chilled water. The carcasses are placed in one end of the tank and moved to the other end by a rotating auger. In order to prevent clumping of the carcasses and to obtain good contact between the poultry carcasses and the chilled water, the chilled water may be agitated by various means, including air bubbles. While the prior art techniques for agitating the chilled water can provide sufficient agitation in some circumstances to achieve good contact between the carcasses and the chilled water, and to minimize clumping of the carcasses, a more effective technique is needed. A drawback of the prior art auger chillers is that the poultry carcasses are locked into one flight of the auger as they move through the chiller. For this reason, it is commonly seen that one flight of a chiller is overloaded while the chiller as a whole is relatively empty. The exception is when the carcasses flow over the top of the auger and move from one flight to the next. This can cause one flight to be loaded too heavily and also influence how long the carcasses remain in the chiller before exiting.

The limitations of the prior art are overcome by the present invention as described below.

BRIEF SUMMARY OF THE INVENTION

The invention is directed to an auger-type poultry chiller having an auger with multiple blades and having a pitch much longer than the short pitch augers of the prior art chillers. For example, where a typical auger blade makes one full revolution about every 4 feet in a standard 60-100 foot chiller, each blade on the auger of the present invention makes one full revolution in about 25 feet.

The multi-blade long-pitch auger is able to move poultry carcasses (also referred as "product") from the entrance or inlet end of the chiller to the unload or outlet end very quickly compared to the prior art chillers because pitch determines the rate of travel of the carcasses through the chiller. When the carcasses get to the outlet end, some of the product exits via an unloader and unload chute, while the rest of the product remains rotating with the auger unlike in the prior art chillers. The blades of the auger create pockets around the auger that spiral around the auger shaft. Each pocket that is created by the multiple long-pitch blades of the auger extends the length of the auger. As a result, the product cannot cross between the pockets. The advantage of this feature is that while the product is locked into a certain pocket, it is not locked into a certain spot lengthwise in the chiller and is therefore free to move along the length of the auger within its pocket. The product, therefore, is able to distribute evenly along the length of the chiller within its pocket even if there are gaps in loading time or if unloading stops momentarily.

This auger design allows the water level to be raised substantially inside the chiller. In a prior art chiller with a typical auger, the water level is commonly maintained slightly above the top of the auger shaft so that the carcasses do not flow over the top of the shaft and move from one flight to another. With the present invention, the water level can be raised to the top of the chiller and product cannot flow from one flight to another. This gives the chiller a much larger chilled water holding capacity compared to the same sized prior art chiller.

Use of the present auger design also causes extra agitation and water flow to help cool the product faster. As the auger rotates, the product will continuously be moving forward and backward inside its pocket within the chiller due to the long pitch of the auger. This feature helps in agitating the product so there is always water flow around the product. As a result, the carcasses are kept from clumping together and having warmer carcasses in the middle of the clump.

These and other features, objects and advantages of the present invention will become better understood from a consideration of the following detailed description of the preferred embodiments in conjunction with the drawings as described following:

BRIEF DESCRIPTION OF THE DRAWINGS

FIG. 4 is a perspective view of the multi-blade long-pitch auger of the present invention.

DETAILED DESCRIPTION OF THE INVENTION

Figure 1:
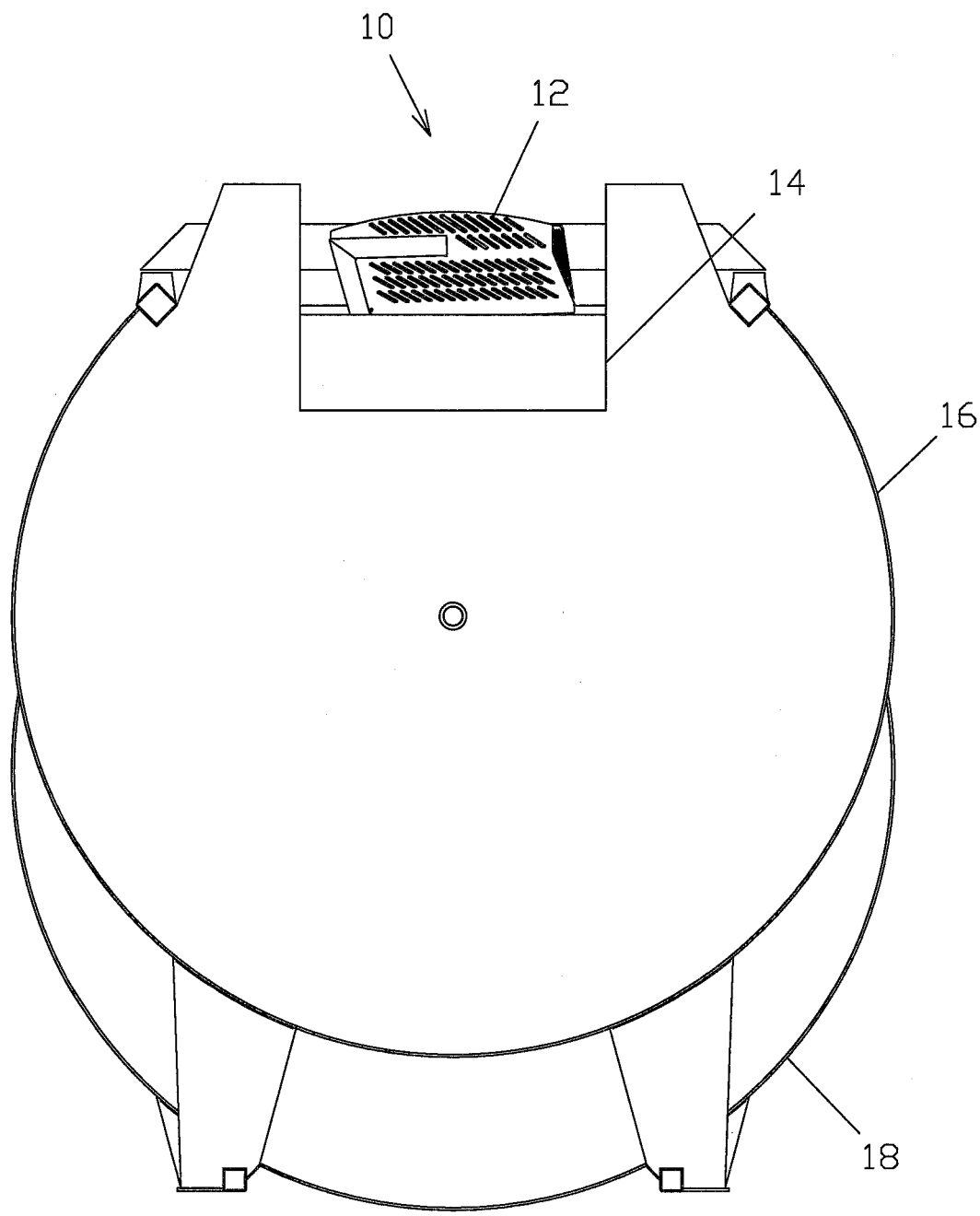
FIG. 1 is an end view of the unloader section of the chiller of the present invention.

With reference to FIGS. 1-4, the preferred embodiments of the present invention may be described. The invention is directed to an auger-type chiller 10 having an auger 20 mounted for rotated within a semi-cylindrical tank 36 filled with chilled water 34. The auger 20 has multiple blades 22, 24, 26 having a pitch. The pitch is the distance between corresponding points on consecutive turns of the auger flighting. The pitch of the auger of the present invention is much longer the single blade augers in the prior art chillers. For example, where the prior art auger blade makes one full revolution in about 4 feet, each blade of the auger of the present invention makes one full revolution in about 25 feet. While the preferable pitch of the auger will depend upon the diameter of the tank of the chiller, the pitch of the auger is preferably 15-40 feet. As shown in FIG. 4, the auger 20 includes a shaft 30 supporting multiple blades 22, 24, 26 that spiral around it. Since the auger has such a long pitch, the blades function more as horizontal dividers forming lengthwise pockets through the tank than the vertical dividers of the prior art augers that prevent product from moving from one pocket to another pocket either in front or behind it.

Figure 2:
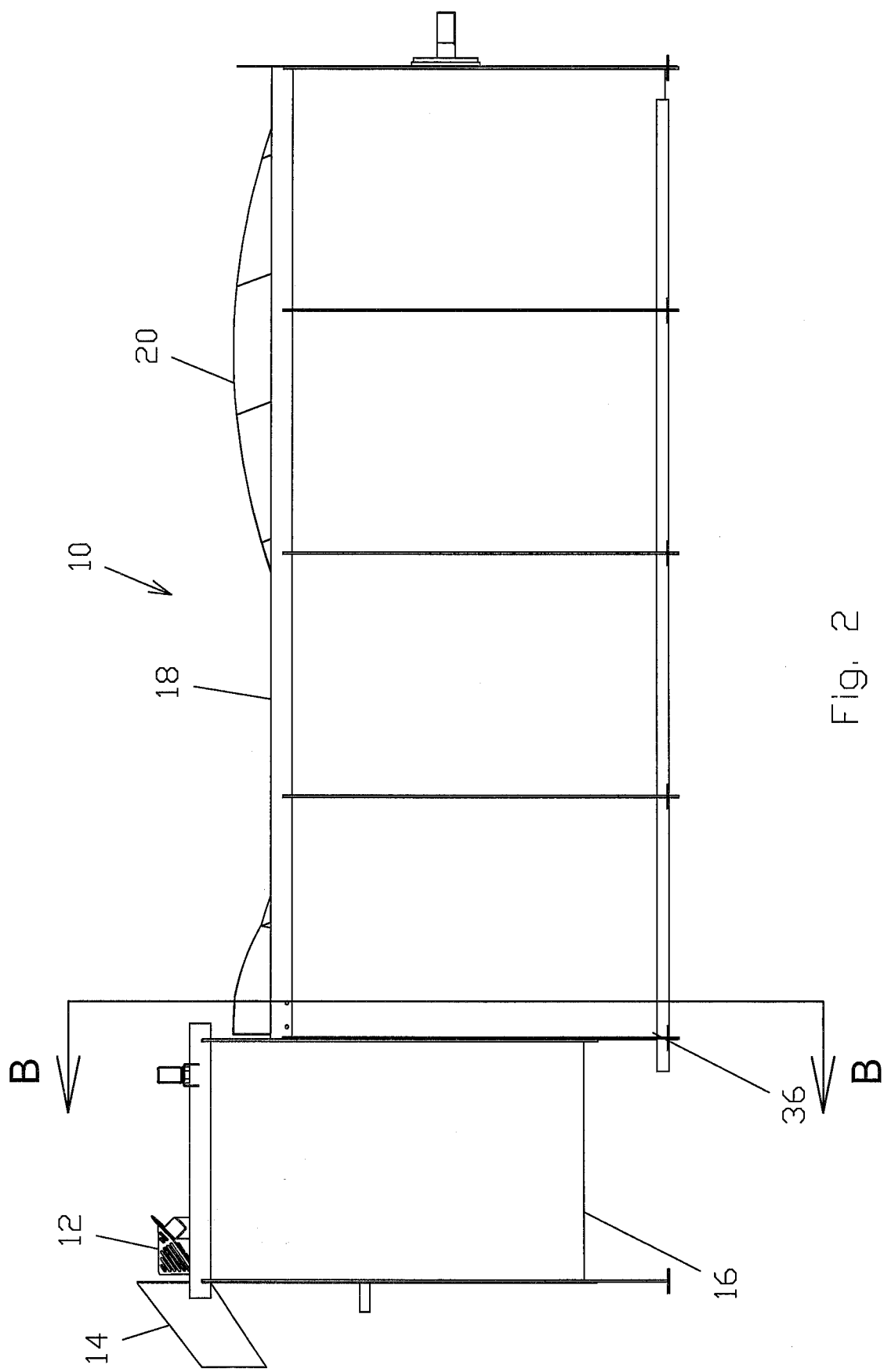
FIG. 2 is a side elevational view of the chiller of the present invention.
Figure 3:
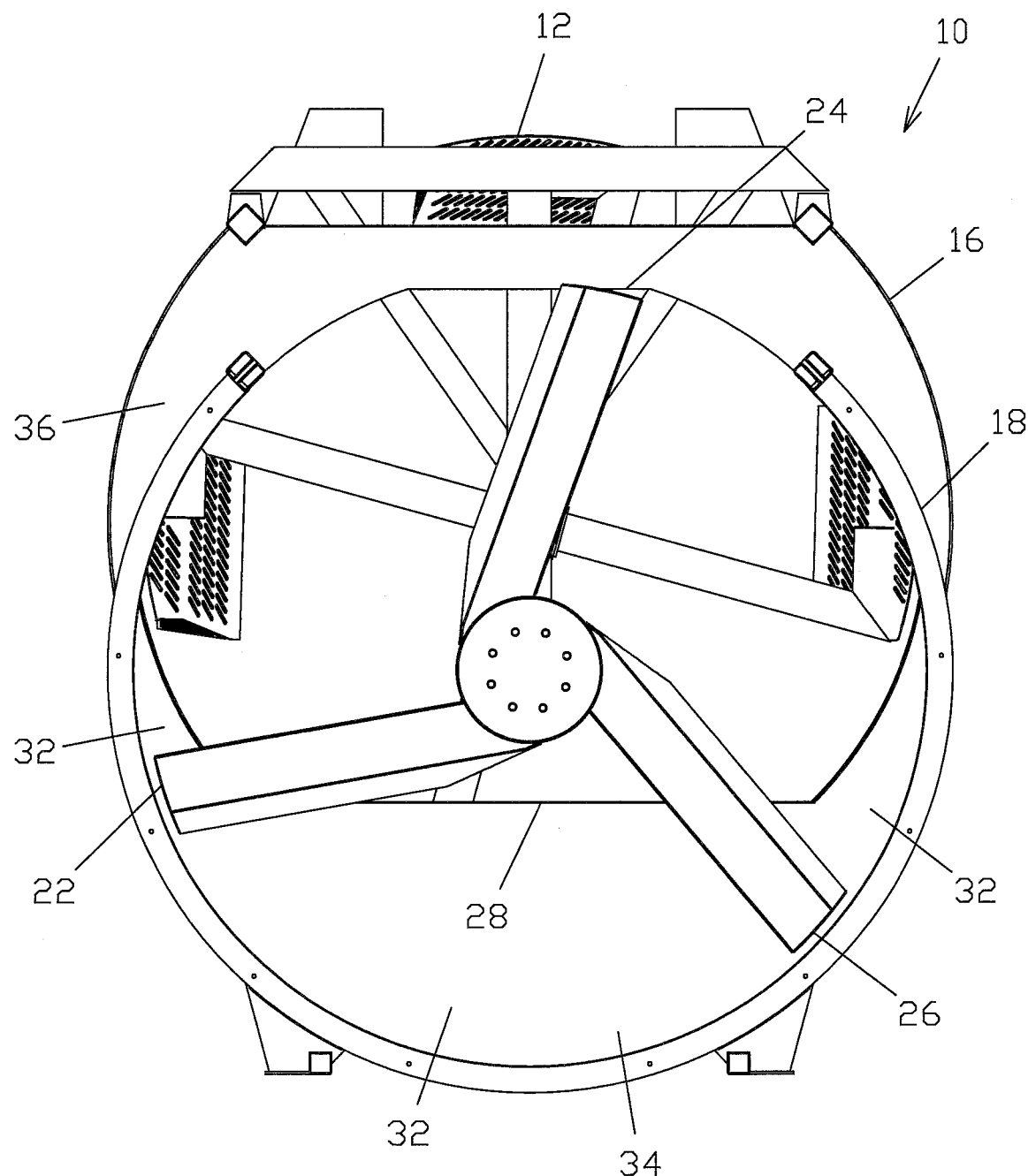
FIG. 3 is sectional view of the auger section of the present invention taken along line B-B of FIG. 2 and looking into the unloader section of the chiller.

The poultry chiller 10 includes a tank 36 having an auger section 18 and an unloader section 16. The auger section 18 of the tank includes the multi-blade, long-pitch auger 20. The auger 20 protrudes through the open top of the auger section 18 and above the auger section 18 on the tank 36 as shown in FIG. 2. The auger 20 is preferably the length and diameter of the auger section 18 of the tank 36. As shown in FIG. 3, the outer edges of the auger 20 conform closely with the inner walls of the auger section 18 of the tank. The unloader section 16 of the tank is elevated in relation to the auger section. The unloader section 16 includes an unloader with unload paddles 12 and an unload chute 14 at the exit end of the tank. The unload paddles 12 rotate and are used to lift the product up and out of the chilled water 34. The product then slides off the unload paddles 12 into, through, and out of the unload chute 14. The unloader and unload chute are preferably of the type well-known to those skilled in the art.

Product is dropped into the top of the chiller 10 at an inlet end of the auger section 18 of the tank 36. As the carcasses are dropped in the chiller, they fall into a pocket 32, which is the space formed between two of the auger blades 22, 24, 26 and the inner surface of the tank. The number of pockets 32 corresponds to the number of auger blades attached to the auger shaft 30. The number of auger blades can vary, however, the auger 20 preferably has three auger blades. As a result, the tank preferably includes three pockets 32. Like the auger blades, the pockets 32 spiral around the auger shaft 30 and run lengthwise through the auger section 18 of the tank 36. Each pocket 32 that is created by the long-pitch auger 20 extends the length of the auger and thus the product cannot cross between the various pockets 32. The advantage of this feature is that while the product is locked into a certain pocket, it is not locked into a certain spot lengthwise in the chiller. The product therefore is free to move along the length of the auger. As a result, product distributes evenly along the length of the chiller within its pocket even if there are gaps in loading time or if unloading stops momentarily. Product will stay inside the pockets 32 until it exits into the unloader section 16 of the tank 36.

As the auger 20 rotates, one of the three pockets is always at the bottom of the chiller. The pocket at the bottom of the chiller at any even time will always be moving towards the unloader section 16 of the tank of the chiller. With the long pitch of the auger blades, the auger 20 will try to push product toward the unloader section 16 of the tank 36 very quickly, but friction will limit the speed of the product and the auger blades will act as paddles to agitate the product. The product moves towards the unloader section 16 of the tank 36, but it does not move as fast as the pocket 32 moves toward the unloader section 16. This is because, in addition to being urged towards the unloader section 16 by the auger blades, the product will also rotate around the auger 20 while in the pocket 32 as a result of the pitch of the auger blades. Rotating around the auger slows the movement of the product towards the unloader section 16 of the tank 36 because the product is not advancing forward when it is rotating around the auger. Product in a prior art chiller with a short pitch auger does not rotate around the auger.

For example, when the auger 20 is rotating clockwise, the product is elevated with a blade 24. Once that blade 24 rotates enough that is it above the auger shaft 30, the product will begin to slide down the spiral blade 24 and fall to the blade 26 positioned below it. After the product moves to the next blade 26, the angle of the blade allows the product to slightly slide back towards the inlet end of the tank 36 as a result of the spiral wrap of the auger blades around the auger shaft 30. This creates a washing effect to clean the product as it moves through the chilled water 34 and to also create agitation to help cool the product and keep it from clumping together.

The chilled water 34 in the tank 36 is preferably raised to the top of the tank 36. Due to raising the water level to the top of the tank, the unloader section 16 of the tank 36 must be raised. The unloader section 16 is semi-cylindrical just like the auger section 18 of the tank. The unload paddles 12 rotate inside the unloader section 16 in an arc that is slightly less than the tank diameter. This leaves only a small amount of clearance so that there is no metal-to-metal contact between the paddles 12 and the tank 36. Since the unloader section 16 and the auger section 18 of the tank are the same diameter, the unloader section 16 is elevated from the auger section 18 so that the unload paddles 12 will be sufficiently above the water level to let product exit the without letting the chilled water 34 exit as well.

By elevating the unloader section 16, the auger blades 22, 24, 26 must lift product from the auger section 18 when it reaches the unloader section 16 and cause the product to slide from the auger blades 22, 24, 26 into the unloader section 16. There is a baffle plate 28 between the auger section 18 and the unloader section 16 of the tank. The baffle plate 28 extends upwardly from the bottom of the tank 36. The auger blades lift the product above the baffle plate 28 to allow the product to slide into the unloader section 16. Enough product must travel from the auger section 18 to the unloader section 16 after each auger blade passes by the baffle plate 28 to maintain a sufficient unloading rate until the next auger blade brings a new supply of product into the unloader section 16.

In one embodiment, the chiller 10 utilizes a control system to determine and monitor how much product needs to be removed from the chiller 10 and when it needs to be removed. This is based on how much product has been put into the chiller 10 and the preferable dwell time of the product for adequate cooling.

The present invention has been described with reference to certain preferred and alternative embodiments that are intended to be exemplary only and not limiting to the full scope of the present invention.

We claim:

1. A chiller, comprising:
    a tank having an inner surface; and
    an auger positioned at least partially within said tank, wherein said auger comprises a longitudinal shaft and a plurality of auger blades, wherein each of said plurality of auger blades spirals around said shaft at a position along said longitudinal shaft, wherein a plurality of spiral pockets are formed by said plurality of auger blades and said inner surface of said tank, wherein said plurality of auger blades are configured to block passage of a poultry carcass between said plurality of spiral pockets.

2. The chiller of claim 1, wherein each of said plurality of auger blades comprises a pitch, wherein said pitch is in the range of 15-40 feet.

3. The chiller of claim 1, wherein said tank comprises an auger section and an unloader section.

4. The chiller of claim 3, wherein said auger section of said tank comprises said auger.

5. The chiller of claim 3, wherein said unloader section of said tank comprises a plurality of unload paddles.

6. The chiller of claim 3, wherein said unloader section of said tank comprises an unload chute.

7. The chiller of claim 3, further comprising a baffle plate, wherein said baffle plate separates said auger section and said unloader section of said tank.

8. The chiller of claim 3, wherein said unloader section of said tank is raised from said auger section of said tank.

9. The chiller of claim 1, wherein said plurality of auger blades comprises three auger blades.

10. The poultry chiller of claim 1, wherein said auger is operable to force said poultry carcass to rotate around said shaft when said auger rotates.

11. The chiller of claim 3, wherein said auger is configured to lift said poultry carcass from said auger section into said unloader section.

12. The chiller of claim 1, wherein each of said plurality of auger blades spirals at least one full revolution around said shaft.

13. A method of cooling a food product comprising the steps of:
    providing a first carcass to a first spiral pocket of a chiller, wherein said first spiral pocket is formed between an inside surface of said chiller and two auger blades spiraled around a shaft of an auger, wherein said first spiral pocket extends from a first end of said chiller;
    providing a second carcass to a second spiral pocket of said chiller, wherein said second spiral pocket is formed between said inside surface of said chiller and two auger blades spiraled around said shaft of said auger, wherein said second spiral pocket extends from said first end of said chiller; and
    rotating said auger to move said first carcass within said first spiral pocket and to move said second carcass within said second spiral pocket, wherein said first carcass is blocked from moving to said second spiral pocket and said second carcass is blocked from moving to said first spiral pocket.

14. The method of claim 13, wherein said first carcass is lifted and delivered to an unloader section of said chiller during said step of rotating said auger.

15. The method of claim 13, further comprising the step of providing a third carcass to a third pocket of said chiller, wherein said third pocket is formed between said inside surface of said chiller and two auger blades spiraled around said shaft of said auger.

16. A chiller, comprising:
    a tank comprising an auger section having an inner surface, wherein said auger section comprises a first end and a second end; and
    an auger positioned at least partially within said auger section of said tank, wherein said auger comprises a shaft and a plurality of auger blades, wherein each of said plurality of auger blades spirals around said shaft, wherein a plurality of spiral pockets are formed between said plurality of auger blades and said inner surface of said auger section of said tank, wherein said plurality of spiral pockets extend between said first end and said second end of said auger section of said tank, wherein said plurality of auger blades are configured to block passage of a poultry carcass between said plurality of spiral pockets.

17. The chiller of claim 16, wherein each of said plurality of auger blades are substantially equally distant from one another around said shaft.

18. The chiller of claim 16, wherein said auger is operable to force said poultry carcass to rotate around said shaft when said auger rotates.

19. A chiller, comprising:
    a tank comprising an inner surface; and
    an auger positioned at least partially within said tank, wherein said auger is comprised of a shaft and a first auger blade, a second auger blade, and a third auger blade attached to said shaft,
    wherein said first auger blade, said second auger blade, and said inner surface of said tank forms a first spiral pocket, wherein said second auger blade, said third auger blade, and said inner surface of said tank forms a second spiral pocket, wherein said third auger blade, said first auger blade, and said inner surface of said tank forms a third spiral pocket, wherein said first spiral pocket is configured to contain a poultry carcass within said first spiral pocket as said auger rotates.

* * * * *